US012790180B2

(12) United States Patent
Soucy

(10) Patent No.: US 12,790,180 B2
(45) Date of Patent: Nov. 10, 2026

(54) SELF-GUIDING GRAPPLE FOR HANDLING FORMWORK PANELS

(71) Applicant: Gabriel Soucy, St-Cyprien-de-Napierville (CA)

(72) Inventor: Gabriel Soucy, St-Cyprien-de-Napierville (CA)

( * ) Notice: Subject to any disclaimer, the term of this patent is extended or adjusted under 35 U.S.C. 154(b) by 1143 days.

(21) Appl. No.: 17/872,071

(22) Filed: Jul. 25, 2022

(65) Prior Publication Data

US 2023/0047423 A1 Feb. 16, 2023

Related U.S. Application Data

(60) Provisional application No. 63/232,466, filed on Aug. 12, 2021.

(51) Int. Cl.
*B66C 1/44* (2006.01)
*B66C 1/42* (2006.01)

(52) U.S. Cl.
CPC .............. *B66C 1/442* (2013.01); *B66C 1/422* (2013.01)

(58) Field of Classification Search
CPC ........... B66C 1/442; B66C 1/66; B66C 1/422; B65G 7/12
USPC .................................................. 294/118, 142
See application file for complete search history.

(56) References Cited

U.S. PATENT DOCUMENTS 2,337,177 A * 12/1943 Breslav ................... B66C 1/422 294/118
3,051,521 A * 8/1962 Skowron ................. B66C 1/422 294/119
3,099,476 A * 7/1963 Miller ..................... B66C 1/422 294/112
3,759,564 A * 9/1973 Seaberg .................... B66C 3/16 294/198
4,169,622 A * 10/1979 Claassen ................. C03B 35/20 294/119

(Continued)

FOREIGN PATENT DOCUMENTS

CN 210313177 U 4/2020
JP H07-196282 8/1995

OTHER PUBLICATIONS

CA 3168684—Office Action, Oct. 2, 2023.

*Primary Examiner* — Paul T Chin
(74) *Attorney, Agent, or Firm* — Agence de Brevets Fournier

(57) ABSTRACT

A grapple for formwork panels includes a scissor arm assembly extending along a longitudinal axis and including at least a proximate pair of arms and a distal pair of arms. The scissor arm assembly is movable between an open position, wherein the distal ends of the distal pair of arms are distanced, and a closed position, wherein the distal ends of the distal pair of arms are in proximity. The grapple further includes a mounting bracket pivotably receiving the proximate pair of arms at the proximate end thereof and a pair of jaw members, each secured to a respective one of the distal pair of arms at the distal ends thereof. Each jaw member has a contact portion, with teeth extending from the contact portion, and having a tip slanted towards the proximate pair of arms, and a deflector guide extending from the contact portion both longitudinally in a direction away from the proximate pair of arms and laterally away from the other jaw member.

22 Claims, 8 Drawing Sheets

(56) References Cited

U.S. PATENT DOCUMENTS

| | | | | | |
|---|---|---|---|---|---|
| 4,262,952 | A * | 4/1981 | Bradley | B66C 1/422 294/118 |
| 5,056,845 | A * | 10/1991 | Cook | E02F 3/962 294/902 |
| 5,364,147 | A * | 11/1994 | Dickey | B66C 1/422 294/902 |
| 6,331,025 | B1 * | 12/2001 | Douglas | B66C 1/442 294/110.1 |
| 7,963,963 | B2 * | 6/2011 | Francischelli | A61B 18/1445 606/205 |
| 9,446,933 | B1 * | 9/2016 | Solomon | B66C 1/44 |
| 11,174,132 | B2 * | 11/2021 | Lusty | B66C 1/442 |
| 2007/0212206 | A1 * | 9/2007 | Milne | A61G 3/063 414/545 |

* cited by examiner

SELF-GUIDING GRAPPLE FOR HANDLING FORMWORK PANELS

CROSS REFERENCE TO RELATED PATENT APPLICATION

This application claims the benefit of U.S. Provisional Application No. 63/232,466, filed on Aug. 12, 2021, the content of which is incorporated by reference herein.

FIELD

The present disclosure relates tools for handling formwork panels. More specifically, the present disclosure is concerned with a grapple for formwork panels that can be attached for example to a crane hook or the likes.

BACKGROUND

One of the first steps in the construction of a building involves the building of a formwork, wherein panels made for example of woods are used to elaborate a structure that will then filled with concrete.

During both the erection and pull down of the formwork, the formwork panels are handled by a worker while it hangs from a crane or the like.

There are no tools currently known that are specifically designed and suitable for a worker to specifically handle a formwork panel in such a context.

Puller pallets have been known to be used by some workers to handle formwork panels. Such tools are in the form of single or double scissors provided with a jaw at one end of the scissor and a chain or an arched end loop at the other end to connect to a chain or strap so that the puller pallets can be attached to a tractor or the like to be pulled. The designed function of such tool is to pull hard-to-reach pallets, for example from a truck bed to the range of a forklift.

As will advise most manufacturers of puller pallets, they are not intended for lifting and are not safe to use as such.

Since they are not intended to be used with large panels, puller pallets tend to twist and deform when holding such a load from above.

Also, not being intended for grabbing a formwork panel from above, puller pallets are dangerous to handle, as, for example, a limb of a worker can be caught in the scissor while it is operated thereby, causing injuries.

Another drawback is that the positioning of a panel in the jaw is far from being automatic and requires abilities and experiences by the worker, even more considering the first identified drawback.

SUMMARY

According to illustrative embodiments, there is provided a grapple for formwork panels comprising:

a scissor arm assembly that is movable between retracted and extended positions along a longitudinal axis; the scissor arm assembly including a pair of first arms, each having proximate and distal ends, that are joined together for relative first pivotal movement about a first transversal axis, and a pair of second arms, each having proximate and distal ends and being pivotably mounted at its distal end to a respective one of the pair of first arms at the proximate end thereof;

a mounting bracket that pivotably receives both second arms via their proximate ends; and a pair of jaw members, each secured to a respective one of the first arms near the distal end thereof; each of the jaw members including a panel-contacting portion that is secured to the respective first arm for contacting with the panel-contacting portion of the other jaw member when the scissor arm assembly is in its extended position; each panel contacting portion having proximate and distal sides; the distal side being further to the second arms than the proximate end; each of the jaw members further including a slanted guide portion extending outwardly from the distal side of the panel-contacting portion so as to define a reflex angle therewith and so that both guide portions together define a wider opening of the pair of jaw members; each panel-contacting portion being further provided with teeth having a beveled tip so as to ease an insertion of a panel between the pair of jaw members from the wider opening when the scissor arm assembly is in its extended position.

According to still other illustrative embodiments, there is provided a grapple for panels comprising:

a scissor arm assembly extending along a longitudinal axis and including at least a proximate pair of arms and a distal pair of arms; each arm of the proximate and distal pairs of arms having a proximate and a distal end; the scissor arm assembly being movable between an open position, wherein the distal ends of the distal pair of arms are distanced, and a closed position, wherein the distal ends of the distal pair of arms are in close proximity;

a mounting bracket pivotably receiving the proximate pair of arms at the proximate end thereof; and a pair of jaw members, each secured to a respective one of the distal pair of arms at the distal ends thereof; each jaw member having a contact portion and teeth extending from the contact portion and having a tip slanted towards the proximate pair of arms and so as to define an acute angle with the longitudinal axis; each pair of jaw members further having a deflector guide extending from the contact portion both longitudinally in a direction away from the proximate pair of arms and laterally away from the other jaw member.

According to another illustrative embodiment, there is provided a grapple for panels comprising:

a scissor arm assembly extending along a longitudinal axis and having a proximate side and a distal side; the distal side having two arms; the scissor arm assembly being movable between an open position and a closed position;

a mounting bracket pivotably receiving the proximate side of the scissor assembly; and a pair of jaw members, each secured to a respective one of the two arms; each jaw member having a contact portion with teeth extending from the contact portion and having a portion that is slanted towards the mounting bracket and so as to define an acute angle with the longitudinal axis; each pair of jaw members further having a deflector guide extending from the contact portion both longitudinally in a direction away from the mounting bracket and laterally away from the other jaw member.

It is to be noted that the terms 'proximate' and 'distal' are not to be construed in any limited way and are used in the description and in the claims using the attachment of the grapple as a reference. A person of ordinary skills in the art would understand that such a reference is subjective and that the opposite could also be used.

Other objects, advantages and features of the grapple for formwork panels will become more apparent upon reading the following non-restrictive description of preferred embodiments thereof, given by way of example only with reference to the accompanying drawings.

DETAILED DESCRIPTION

Figure 1:
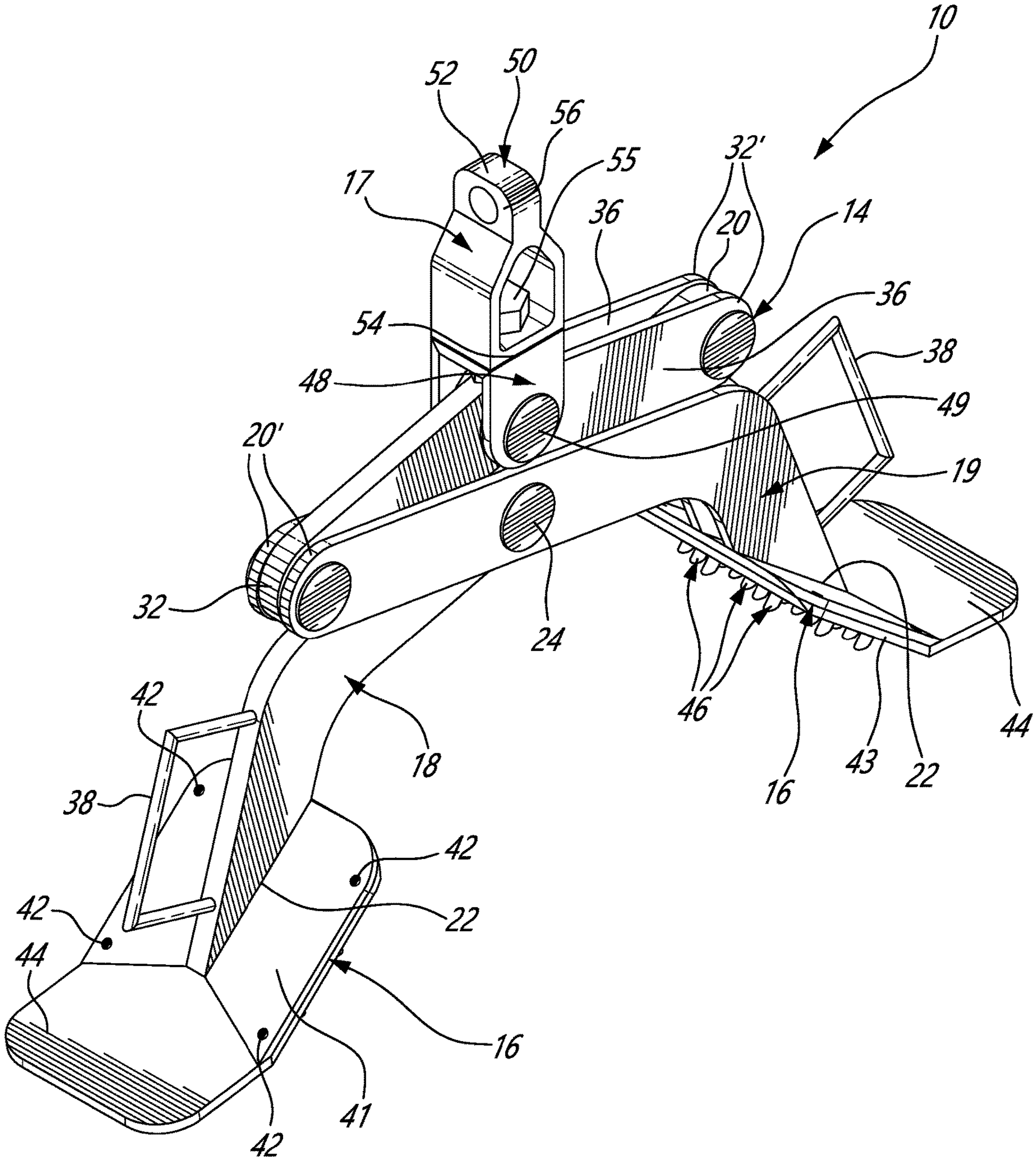
FIGS. 1 and 2 are perspective views of a grapple for formwork panels according to a first illustrative embodiment, showing respectively the grapple fully opened and fully closed.

In the following description, similar features in the drawings have been given similar reference numerals, and in order not to weigh down the figures, some elements are not referred to in some figures if they were already identified in a precedent figure. Herein, it shall further be noted that, for avoiding unnecessary details obscuring the invention, only device structures and/or processing steps closely relevant to schemes according to the invention are shown in the accompanying drawings while omitting other details less relevant to the invention.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "container" (and any form of container, such as "contain" and "contains"), are inclusive or open-ended and do not exclude additional, un-recited elements.

Figure 2:
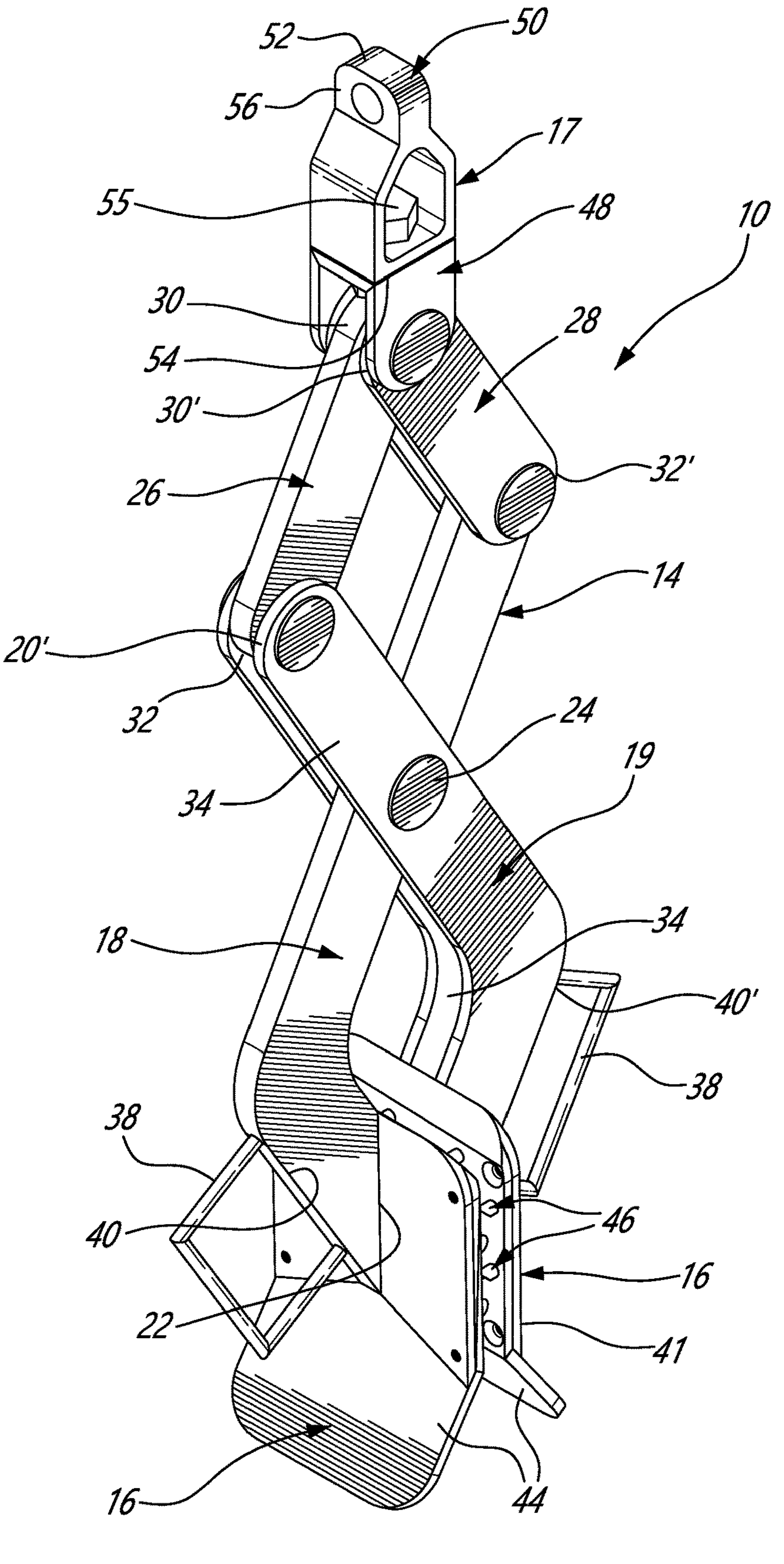
Figure 3:
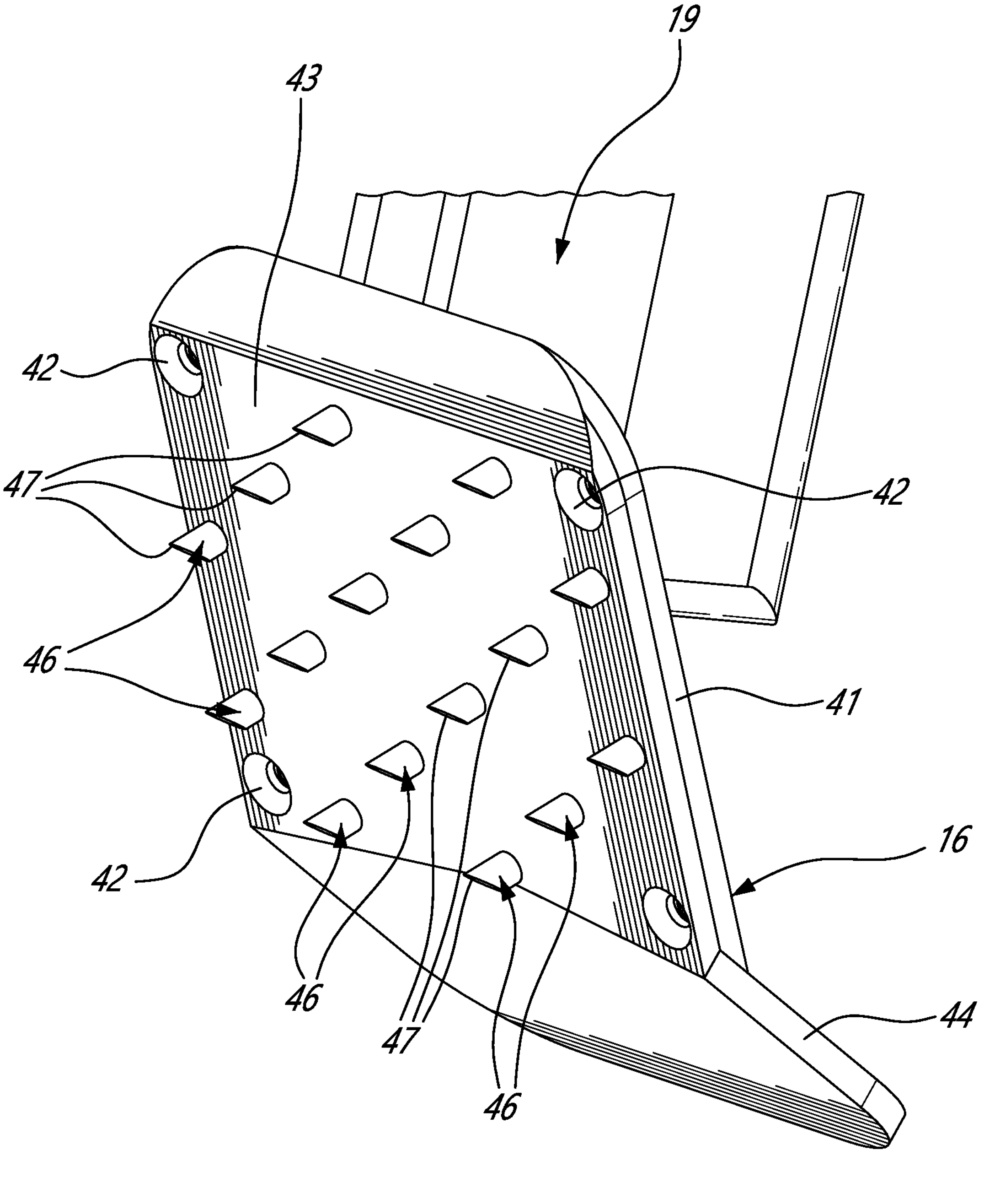
FIG. 3 is a close-up perspective view of one of the jaw members of the grapple from FIGS. 1 and 2.

A grapple 10 for formwork panels 12 according to a first illustrative embodiment will now be described with reference first to FIGS. 1 to 3.

The grapple 10 comprises a scissor arm assembly 14 that is movable between retracted and extended positions (see FIGS. 1 and 2 respectively), a pair of jaw members 16 secured to the scissor arm assembly 14 at a distal end thereof, and a mounting bracket 17 secured to the scissor arm assembly 14 at a proximate end thereof.

The scissor arm assembly 14 includes a first stage defined by a pair of generally L-shaped arms 18-19, each having proximate and distal ends 20-20' and 22-22', that are joined together via a pivot pin 24 for relative first pivotal movement about a first transversal axis defined by the pin 24. The scissor arm assembly 14 also includes a second stage defined by second arms 26-28, each having proximate and distal ends 30-30' and 32-32' and being pivotably mounted at their distal end 32-32' to a respective one of the pair of arms 18-19 at the proximate end 20'-20 thereof.

The first and second arms 19 and 28 are each defined by two identical parallel elongated plates 34 and 36 respectively, which allow pivotably mounting the second and first arms 26 and 14 therebetween. According to the illustrative embodiment, the thickness of each of the plates 34 and 36 is 9.53 mm (⅜ inch).

The single arm 26 of the second stage is similarly pivotably mounted to both arms 28 therebetween at their proximate ends 30-30'. According to the illustrative embodiment, the thickness of each of the single arms 18 and 26 is 19.05 mm (¾ inch).

As it is believed to be commonly known in the art, scissor arm assemblies including two stages such as assembly 14 are known as single scissor assembly.

Each of the first arms 18 and 19 are provided with a handle 38, in the form of a U-shaped member secured thereon near the distal end thereof, for example using welding. More specifically, each handle 38 is located on a lateral side 40 and 40' of a respective arm 18 and 19 that is opposite the jaw member 16. In operation, the handles 38 allow a user either moving or opening the grapple 10, while keeping its hands away from the central portion thereof, thereby limiting the risks of injuries.

Each jaw member 16 is removably mounted to a respective one of the first arms 18 and 19 at the distal end thereof 22 via a mounting plate 41 that is secured to a respective arm 18 and 19 using for example welding. Each jaw member 16 is attached to the mounting plate 41 using fasteners. For that purpose, each plate 41 is provided with four (4) fastener-receiving holes 42.

Each of the jaw members 16 is generally V-shaped and includes a panel-contacting portion 43 that is attached to a respective plate 41 and a slanted portion 44 extending outwardly from the panel-contacting portion 43 so as to define a reflex angle therewith. The slanted portions 44 together define a wider opening for the jaw members 16 on the side thereof opposite the scissor arm assembly 14.

The side of the panel-contacting portion 43 that is opposite the mounting plate 41 is provided with teeth 46 that aim at increasing the grasp of the jaw members onto a panel 12 when the grapple 10 is in its extended position and its jaw, formed by both members 16, is closed onto the panel 12. The teeth 46 includes a beveled tip 47, that defines an angle of about 45 degrees with the side that is opposite the slanted portion 44. On such opposite side, each tooth 46 is generally perpendicular to the plate 41. As will be described hereinbelow in more detail, such non-limited configuration of the teeth 46 allows the automatic insertion of a panel 12 when the grapple 10 descend thereon, while increasing the bite thereon when the grapple 10 is raised with the panel 12.

According to another embodiment, the number, location and/or configuration of the teeth 46 onto the jaw members 16 are different than illustrated.

The dimensions of the panel-contacting portions 43 are sufficient to promote the contact and bite onto the panel 12 while preventing its damaging. Indeed, it has been found that the grapple 10 sometimes must be moved from side to side and laterally to remove the panel 12 therefrom when a panel 12 is grasped between its jaw members 16. The use of one or both handles 38 by the user is convenient impart such movements to the grapple 10.

According to the illustrated embodiment, the panel-contacting portions 43 have a width of 120 mm and a height of 110 mm. Also, the thickness and configuration of the arms 18, 19, 26 and 28 are such as to withstand same movements of the grapple 10 in operation, and so is the configuration of the pivot pins 24, 49 et al., which have 19.05 mm (¾ inch) in diameter.

The removable mounting of the jaw-members 16 allows their changing when they are worn or to selectively mount other jaw-members which are adapted for a specific type of panels (not shown).

The mounting bracket 17 includes a U-shaped portion 48 that pivotably receives both second arms 26-28 via their proximate ends 30-30' via a pivot pin 49, and an anchoring portion 50 having proximate and distal sides 52-54 and that is swivel mounted to the U-shaped portion 48 on its distal side 54 via a bolt 55 or another fastener. The anchoring portion 50 includes a link-receiving portion 56 on its proximate side 52.

According to the illustrated embodiment, all parts of the grapple 10 are made of hardened steel. According to another embodiment (not shown), some or all parts of the grapple 10 are made from another metallic or hybrid material.

Figure 4A:
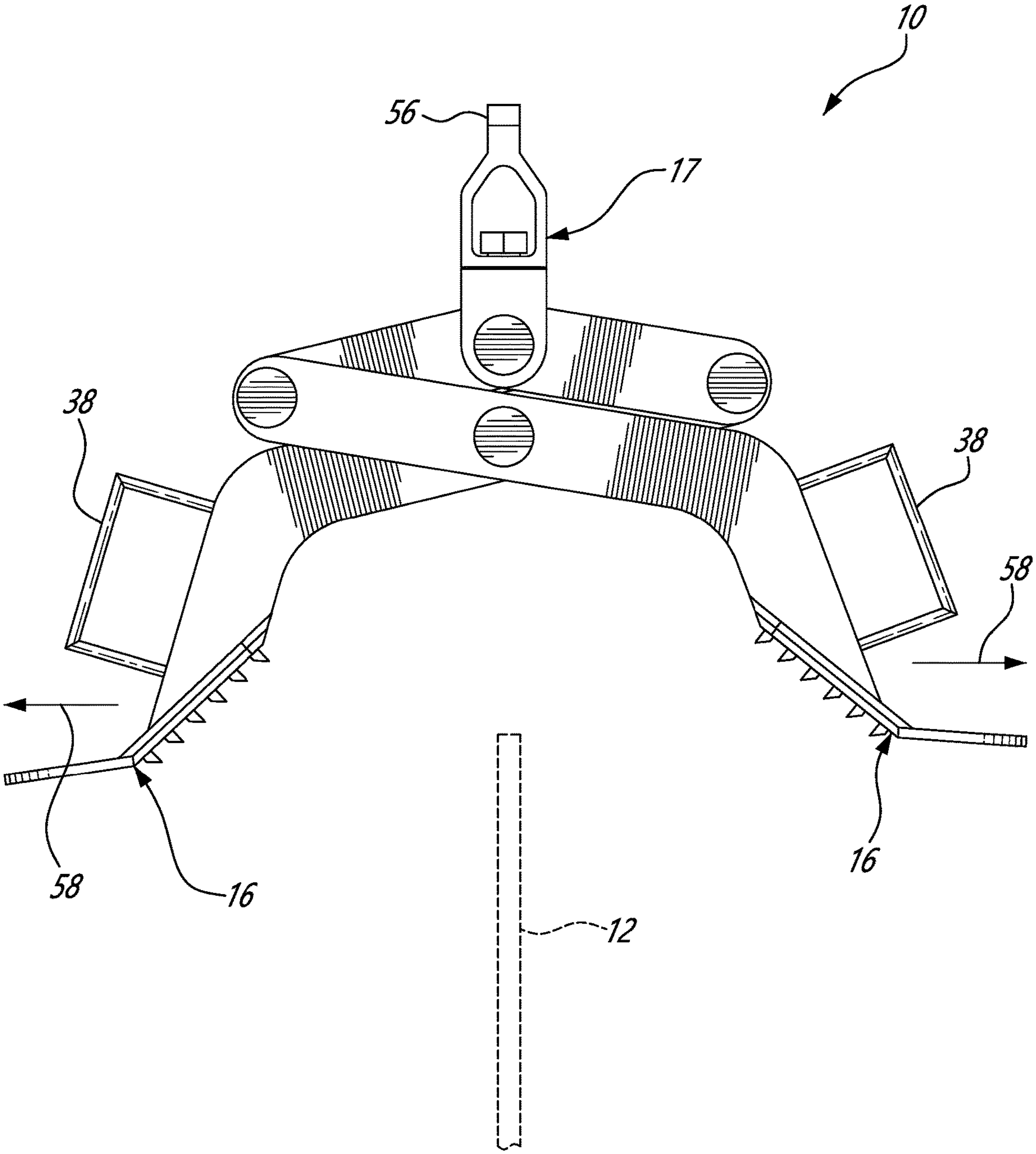
FIGS. 4A-4C are front elevations of the grapple from FIGS. 1 and 2, illustrating the use thereof in grabbing a formwork panel.
Figure 4B:
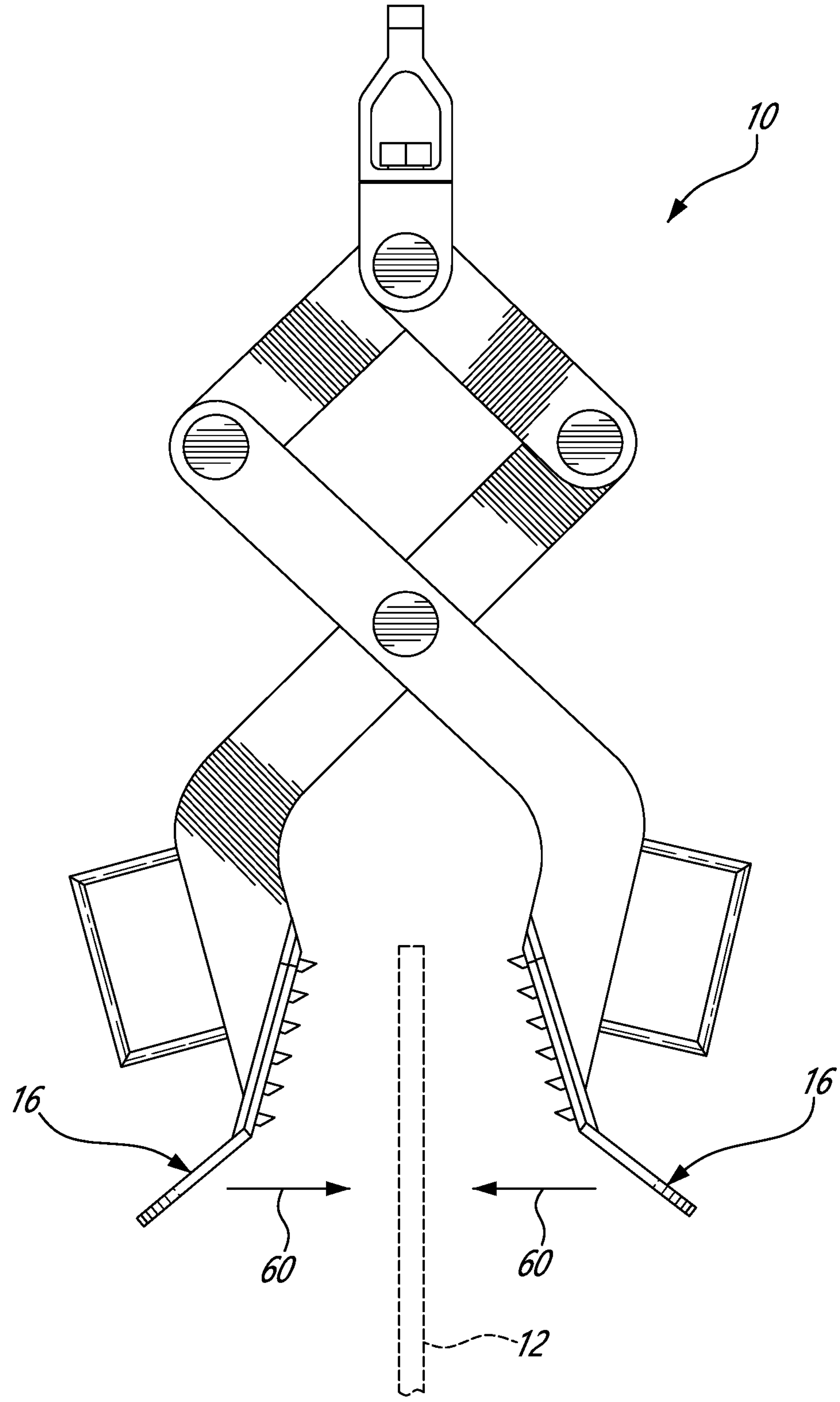
Figure 4C:
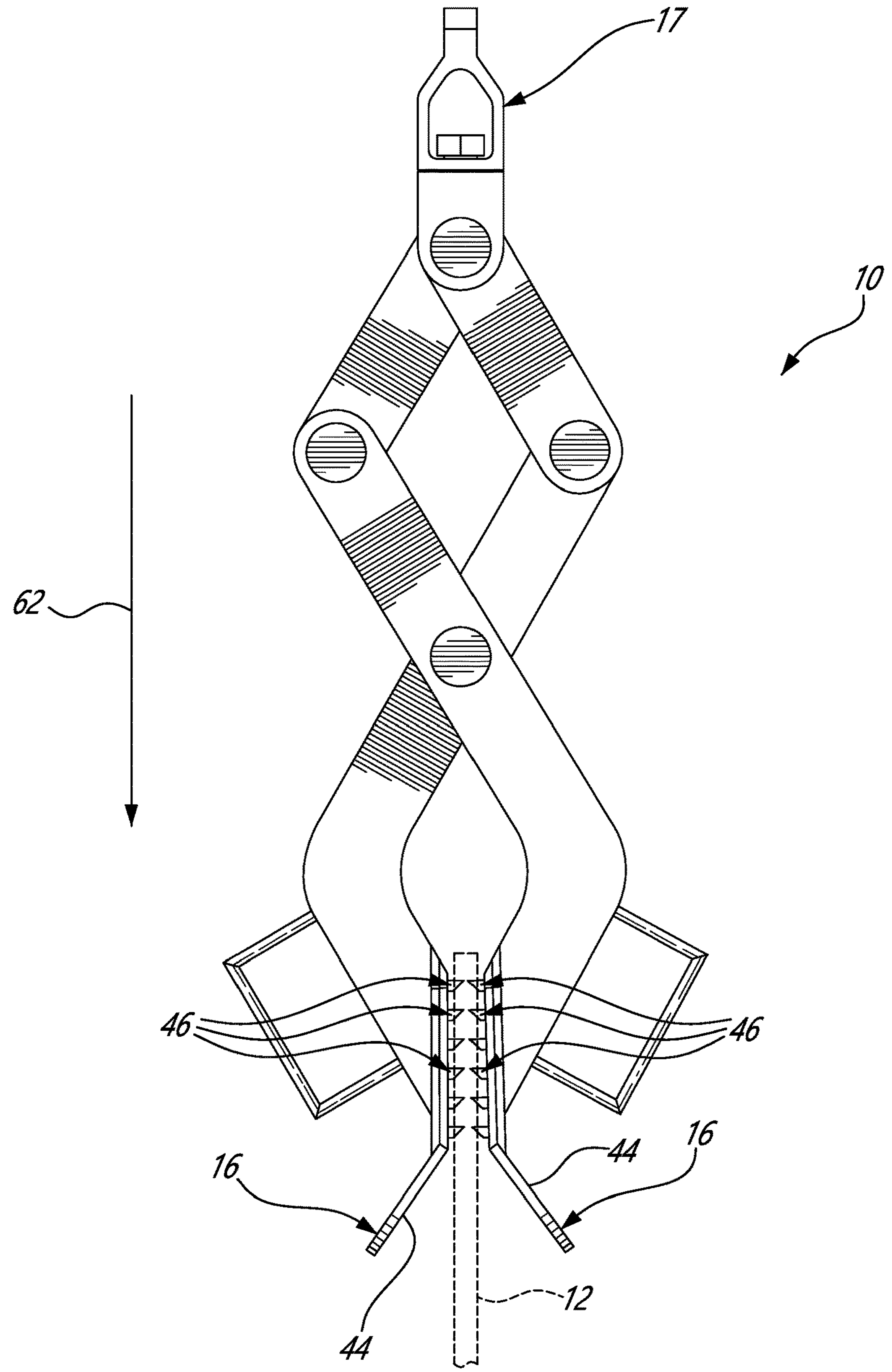

With reference to FIG. 4A-4C, the operation of the grapple 10 will now be described.

In FIG. 4A, the grapple 10 is moved near a formwork panel 12 by a crane or another similar machinery (not shown). For that purpose, the grapple 10 is attached thereto, for example via its hook block (not shown), by a conventional link such as a shackle (not shown), secured to the link-receiving portion 56 of the mounting bracket 17.

An operator (not shown) then uses one or both handles 38 to move the grapple 10 more precisely above the panel 12 and to move the handle(s) 38 to position the grapple 10 towards its retracted position, moving the jaw members 16 away from each other (see arrow 58). It is to be noted that, while FIG. 4A is shown with the grapple 10 fully opened, a minimal opening thereof is required in most cases for the insertion of the panel 12 between the jaw members 16.

Also, the configuration of the jaw members 16, including its wide opening and the configuration of its teeth 46, allows alternatively for the automatic grasping of the panel 12 simply by precisely positioning the grapple 10 above the panel 12 and by descending it thereon. This can all be achieved by a machinery operator.

A person skilled in the art will appreciate that the positioning of the grapple 10 relative to the panel 12 is greatly facilitated by the scissor assembly 14 being swivel mounted to crane, and by the presence of the handles 38.

When the grapple 10 is so positioned that the jaw members 16 are on respective sides lateral of the panel 12, the handle(s) 38 are released by the operator, which results in the grapple 10 automatically moving towards its extended position under the force of gravity (see arrows 60), causing the jaw members 16 to close onto the panel 12 (see FIG. 4B). Again, as described hereinabove, the grapple 10 is configured so that such an operation can be achieved automatically without an operator manually handling it directly.

As can be seen in FIG. 4C, the weight of the grapple 10 causes the teeth 46 to bite into the wood of the panel 12. Hence, the panel 12 is firmly secured between the jaw members 16 and can be moved safely by the crane to another location.

The alternative machine operation of the grapple 10 will now be summarized. Because it is hanged by its mounting bracket 17, and under its own weight, the neutral position of the grapple 10 is its closed/extended position of Figured 4C shown in FIG. 4C. When the grapple 10 is positioned by the machine operator above a panel 12 to be grabbed, the same operator simply descends the grapple 10 so that the panel 12 is moved between the jaw member 16 (see arrow 62). This is allowed by the beveled teeth 46 and facilitated by the slanted portions 44 of the jaw members 16, which act as deflectors to move the grapple 10 into operational alignment with the panel 12. As discussed hereinabove, the weight of the grapple 10 causes the teeth 46 to bite into the wood of the panel 12 and the panel 12 can be moved safely by the crane to another location.

It is to be noted that many modifications could be made to the grapple 10 described hereinabove and illustrated in the appended drawings. For example:

- while the scissor assembly 14 includes two (2) stages, it can be configured with more stages;
- the arms 18, 19, 26 and 28 can have other configuration and/or length than illustrated. For example, the arms 18 and 19 can be straight The jaw members 16 are also not limited to having the illustrated configuration and dimensions. Also, the slanted portions 44 can be more or less slanted than illustrated or omitted;
- one or both of the handles 38 can have a different configuration than illustrated or omitted;
- while the jaw members 16 are described as being removably mounted to the arms 18 and 19, they can be made integral using welding, attachments or during the molding thereof;
- the jaw members 16 are not limited to being longitudinally registered;
- while the scissor assembly 14 includes two double arms 34 and 36, which allow pivotably mounting the second and first arms 26 and 14 therebetween, a scissor arm assembly 14 provided with only single arms can also be provided (not shown), wherein, for example, some of such single arms can be provided with grooves at their longitudinal ends to allow pivotably mounting other arms therein;
- other members or mechanisms than pins or bolts can be used to pivotably assemble parts of the grapple;
- the grapple 10 is not limited to being usable to move formwork panels 12 and can be used with any other types of panels;
- the configuration of the mounting bracket 17, including the link-receiving portion thereof 56, can be different than illustrated.

Figure 5:
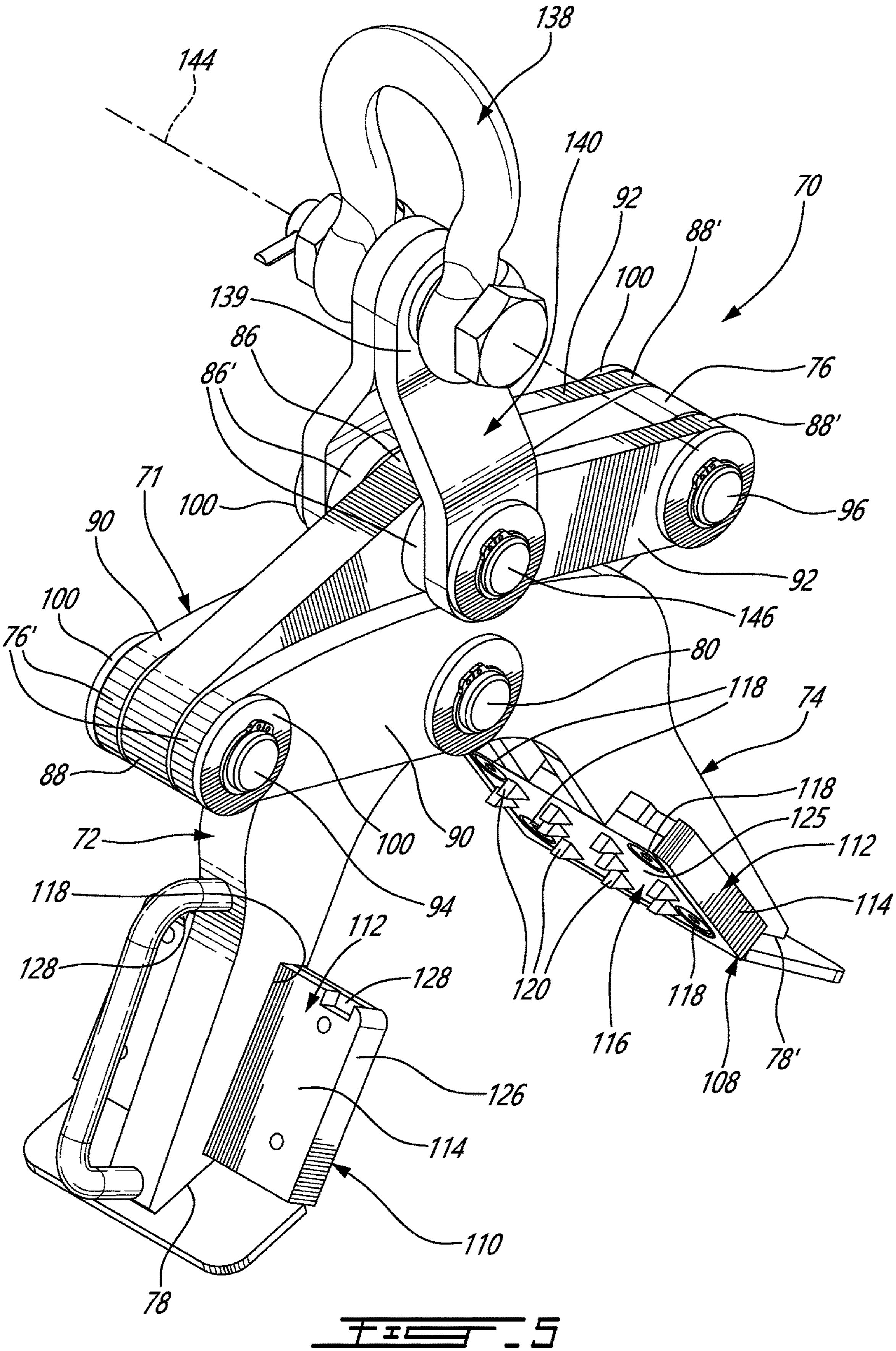
FIG. 5 is a perspective view of a grapple for formwork panels according to a second illustrative embodiment, the grapple being shown fully opened.

A grapple 70 for formwork panels 12 according to a second illustrative embodiment will now be described with references to FIGS. 5 and 6.

Since the grapple 70 is similar to the grapple 10, only the differences therebetween will be described herein for concision purposes.

The scissor arm assembly 71 of the grapple 70 includes a first stage defined by a pair of generally flattened L-shaped arms 72-74, each having proximate and distal ends 76-76' and 78-78', that are joined together via a pivot pin 80 for relative first pivotal movement about a first transversal axis defined by the pin 80. The scissor arm assembly 71 also includes a second stage defined by second arms 82-84, each having proximate and distal ends 86-86' and 88-88' and being pivotably mounted at their distal end 88-88' to a respective one of the pair of arms 72-74 at the proximate end 76-76' thereof.

The first and second arms 74 and 84 are each defined by two identical parallel elongated plates 90 and 92 respectively, which allow pivotably mounting the second and first arms 82 and 72 therebetween via respective pivot pins 94 and 96.

According to the illustrative embodiment, the plates making the arms 72-74 and 82-84 are about 60 percent thicker than those of the scissor assembly 14, making the grapple 70 more sturdy.

The pivot pins 80, 94 and 96 are configured at both their longitudinal ends to receive C-clips 98. Washers 100 are further provided at both longitudinal ends of the pins 80, 94 and 96 to secure the arms 72-74 and 82-84 along with the C-clips 98.

Figure 6:
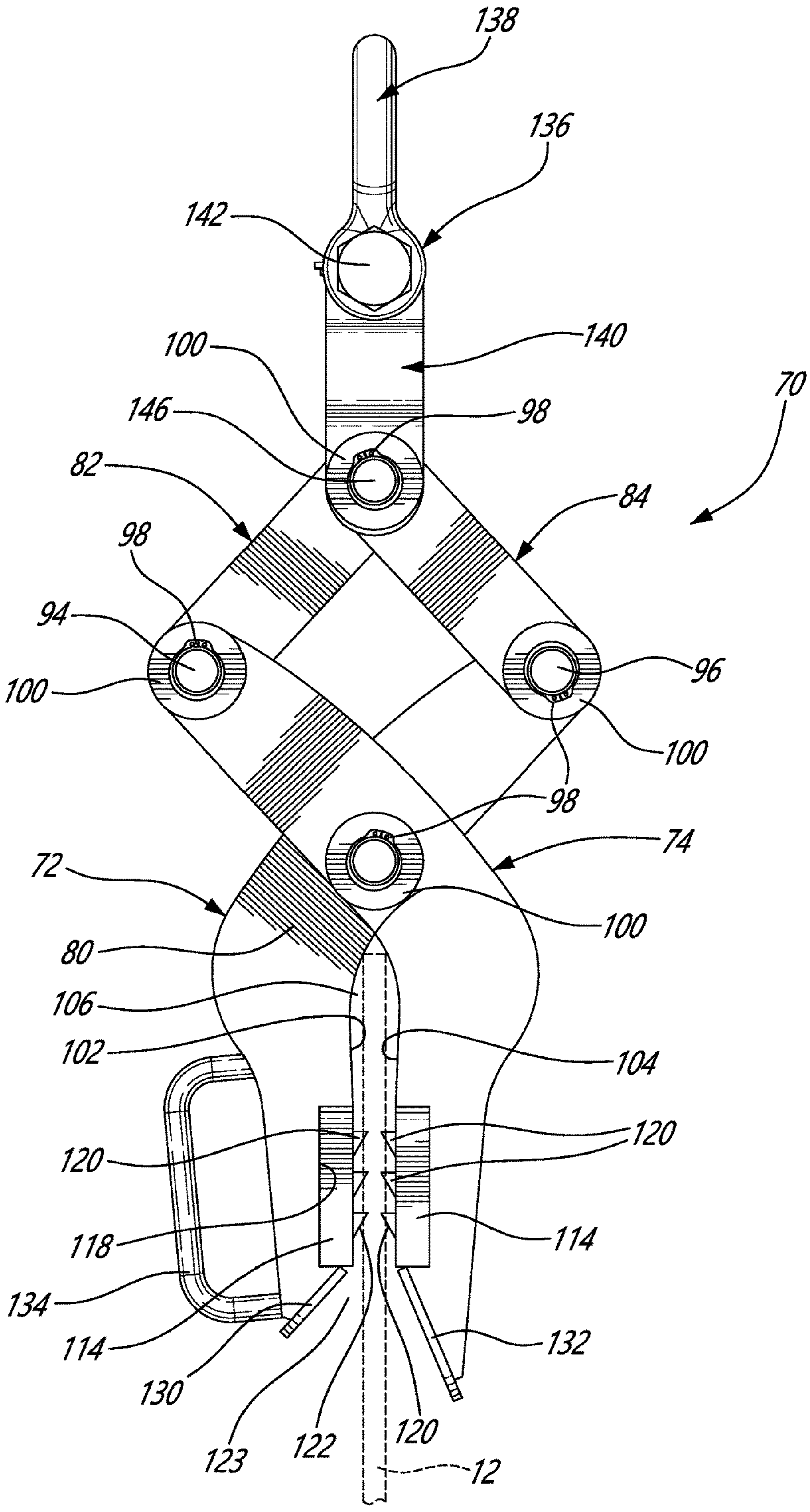
FIG. 6 is a front elevation of the grapple from FIG. 5, showing the grapple fully closed and grabbing a formwork panel.

In comparison to the scissor assembly 14, the scissor assembly 71 is configured and sized so that the grappling portions 102 and 104 of the first arms 72 and 74, i.e., the portions thereof that extend between the pivot pin 80 and their respective distal end 78 and 78' are generally parallel when the scissor assembly is in its extended position (see FIG. 6).

The grapple 70 comprises asymmetrical jaw members 108 and 110. Both includes identical panel-contacting portion 112 that is secured to a respective first arm 72 and 74 near their distal ends 78 and 78' so as to be substantially registered when the grapple 70 is in its extended position.

More specifically, each panel-contacting portion 112 includes a mounting portion 114, which is fixedly attached to a respective first arm 72, 74, and a removable portion 116, which is removably mounted to the mounting portion 114.

The mounting portion 114 is in the form of a flat rectangular receptacle which is recessed in the arm 72, 74, perpendicularly thereto and secured thereto using welding. Each arm 72, 74 includes a notch 118 that is shaped to complementary receive the receptacle 114.

The removable portion 116 is in the form of a plate that is shaped to be complementary received in the receptacle 114. The plate 116 is attached to the receptacle 114 therein using fasteners 118.

The plate 116 is provided with a plurality of triangular-shaped teeth 120 that are integrated. Each tooth 120 has a slanted face 122 on the side of the opening 123 of the jaw which defines about a 60 degrees angle with the normal to the plate 116, and a face 124 that is opposite the opening 123 and that is perpendicular to the surface 125 of the plate 116. As discussed hereinabove, the teeth 120 can have another configuration and define another angle with the surface 125 of the plate 116 than illustrated. Also, the teeth 120 can all be identical, or some can be differently configured than other.

To help in the removal of the plates 116, the peripheral edge 126 of the receptacle 114 includes notches 128 to improve access to the plate 116 when the fasteners 118 are removed.

As another difference between the grapple 70 and the grapple 10, the first arm 72 is shorter than the first arm 74 and the deflecting guide 130 mounted at the distal end 78 thereof is both less angle and shorter than the deflecting guide 132 that is secured at the distal end 78' of the first arm 74. This results in an asymmetrical mouth of the jaw defined by both jaw members 108 and 110. In operation, this asymmetry of the mouth has been found to be helpful in grabbing a panel 12. Indeed, the shorter arm 72 defines a shoulder portion with the longer arm 74 that can be used as a guide to orient the grapple 70 when it first contacts a panel 12, for example perpendicularly thereof.

The grapple 70 is also provided with a single handle 134, that is C-shaped and that is positioned to the shorter arm 72 of the side thereof opposite the panel-contacting portion 112 thereof, substantially registered therewith.

Positioning the handle 134 on the side of the shorter arm 72 has been found to improve the manual-visual guidance of the grapple 70 by an operator (not shown).

The mounting bracket 136 of the grapple 70 includes a shackle 138 that is pivotably mounted to the single-arm side 139 of a Y-bracket 140 using a fastener 142, which defines a pivot axis 144 that is parallel to the pivot pins 80, 94 and 96. The double-arm side of the Y-bracket 140 pivotably received both second arms 82 and 84 via a pivot pin 146, secured in place at both end using a washer 100 and a C-clip 98.

According to another embodiment (not shown), the shackle 138 is mounted to the second arms 82 and 84 via another mounting element than a Y-bracket and/or so as to be oriented differently than illustrated.

Although a grapple for formwork panels has been described hereinabove by way of illustrative embodiments thereof, it can be modified. It is therefore to be understood that numerous modifications may be made to the illustrative embodiments and that the scope of the claims should not be limited by the illustrative embodiments but should be given the broadest interpretation consistent with the description as a whole.

What is claimed is:

1. A grapple for formwork panels comprising:

a scissor arm assembly that is movable between retracted and extended positions along a longitudinal axis; the scissor arm assembly including a pair of first arms, each having proximate and distal ends, that are joined together for relative first pivotal movement about a first transversal axis, and a pair of second arms, each having proximate and distal ends and being pivotably mounted at its distal end to a respective one of the pair of first arms at the proximate end thereof;

a mounting bracket that pivotably receives both second arms via their proximate ends; and a pair of jaw members, each secured to a respective one of the first arms near the distal end thereof; each of the jaw members including a panel-contacting portion that is secured to the respective first arm for contacting with the panel-contacting portion of the other jaw member when the scissor arm assembly is in its extended position; each panel contacting portion having proximate and distal sides; the distal side being further to the second arms than the proximate end; each of the jaw members further including a slanted guide portion extending outwardly from the distal side of the panel-contacting portion so as to define a reflex angle therewith and so that both guide portions together define a wider opening of the pair of jaw members; each panel-contacting portion being further provided with teeth having a beveled tip so as to ease an insertion of a panel between the pair of jaw members from the wider opening when the scissor arm assembly is in its extended position;

wherein, upon lowering the grapple onto a panel, the slanted guide portions and the beveled tips of the teeth cooperate to guide the panel into position between the jaw members and to facilitate automatic engagement of the panel by the jaw members.

2. The grapple as recited in claim 1, wherein each of the first arms are substantially L-shaped.

3. The grapple as recited in claim 1, wherein the second arms are straight.

4. The grapple as recited in claim 1, wherein a first one of the first arms includes two first elongated parallel plates that pivotably receives a first one of the second arms therebetween; a second one of the second arms includes two second elongated parallel plates that pivotably receives a second one of the first arms therebetween.

5. The grapple as recited in claim 1, wherein at least one of the first arms includes a handle near the distal end thereof.

6. The grapple as recited in claim 5, wherein the handle is position on the at least one of the first arms on a side thereof opposite the jaw member.

7. The grapple as recited in claim 1, wherein at least one of the jaw members is removably mounted to the respective one of the first arms.

8. The grapple as recited in claim 1, wherein at least one of the jaw members includes a mounting portion secured to the respective one of the first arms and a removable portion, removably mounted to the mounting portion.

9. The grapple as recited in claim 8, wherein the mounting portion is a mounting plate, and the removable portion is V-shaped.

10. The grapple as recited in claim 9, wherein the V-shaped removable portion includes a) the panel-contacting portion, which is attached to the mounting plate, and b) the slanted guide portion that extends outwardly from the panel-contacting portion so as to define the reflex angle therewith.

11. The grapple as recited in claim 8, wherein the mounting portion includes a flat rectangular receptacle and the removable portion includes a plate, which defines the panel-contacting portion, and that is complementary mountable in the rectangular receptacle.

12. The grapple as recited in claim 11, wherein the flat rectangular receptacle includes a peripheral edge that is provided with at least one notch to allow access to the plate when the plate is mounted therein.

13. The grapple as recited in claim 11, wherein each of the first arms is provided with a notch to complementary receive the flat rectangular receptacle.

14. The grapple as recited in claim 1, wherein the mounting bracket includes a U-shaped portion that pivotably receives both second arms via their proximate ends, and an anchoring portion having proximate and distal sides and that is swivelly mounted to the U-shaped portion on its distal side and that includes a link-receiving portion on its proximate side.

15. The grapple as recited in claim 1, wherein the mounting bracket includes a shackle that is pivotably mounted to both second arms via a Y-bracket.

16. The grapple as recited in claim 1, wherein the jaw members are substantially registered along the longitudinal axis.

17. The grapple as recited in claim 1, wherein at least one of i) the first pair of arms, ii) a first arm and a second arm, and iii) the mounting bracket and both second arms, are assembled for pivotal movement via a pivot pin having two longitudinal ends and are secured at at least one its two longitudinal ends by a washer and a C-clip.

18. The grapple as recited in claim 1, wherein the scissor arm assembly is configured so that respective portions of the first arms between the first transversal axis and the distal ends thereof is substantially parallel when the scissor arm is in its extended position.

19. The grapple as recited in claim 1, wherein at least one of i) the pair of jaw members and ii) portions of the first arms near the distal ends thereof are different.

20. The grapple as recited in claim 1, wherein lengths of the portions of the first arms between the first transversal axis and the distal ends thereof are different for both first arms.

21. The grapple as recited in claim 1, wherein at least one of lengths or the reflex angle of the slanted guide portion are different for both first arms.

22. The grapple as recited in claim 1, wherein at least one of the teeth is triangular-shaped.

* * * * *